Jan. 22, 1924.
G. GREEN
HULL OR BODY CONSTRUCTION OF SHIPS, AIRCRAFT, AND MOTOR ROAD VEHICLES
Filed April 9, 1923  4 Sheets-Sheet 1
1,481,707
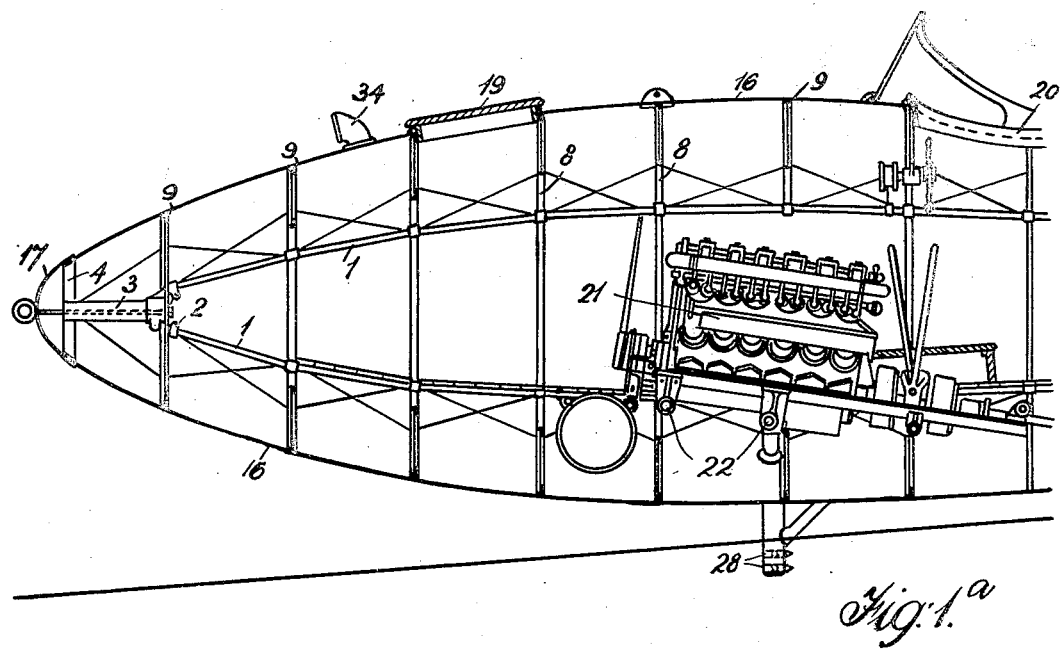
Fig. 1.ᵃ
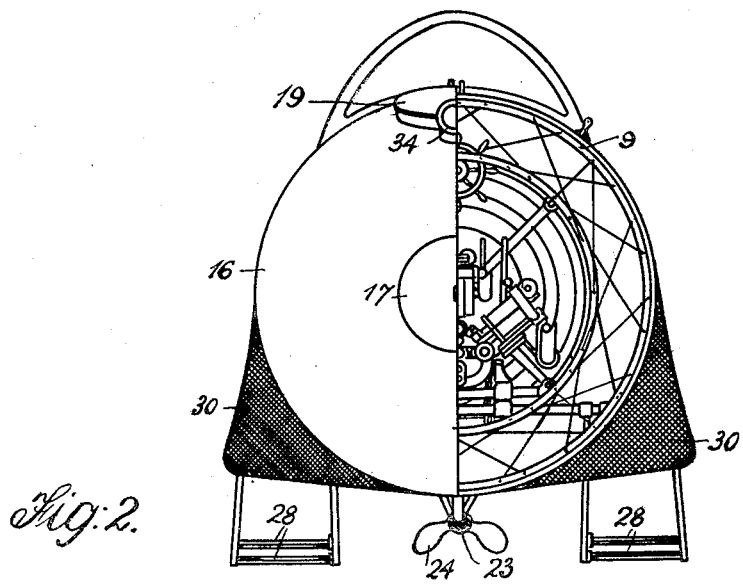
Fig. 2.
INVENTOR.
Gustavus Green.
by A. T. Odell
Attorney.

Jan. 22, 1924. 1,481,707
G. GREEN
HULL OR BODY CONSTRUCTION OF SHIPS, AIRCRAFT, AND MOTOR ROAD VEHICLES
Filed April 9, 1923 4 Sheets-Sheet 2
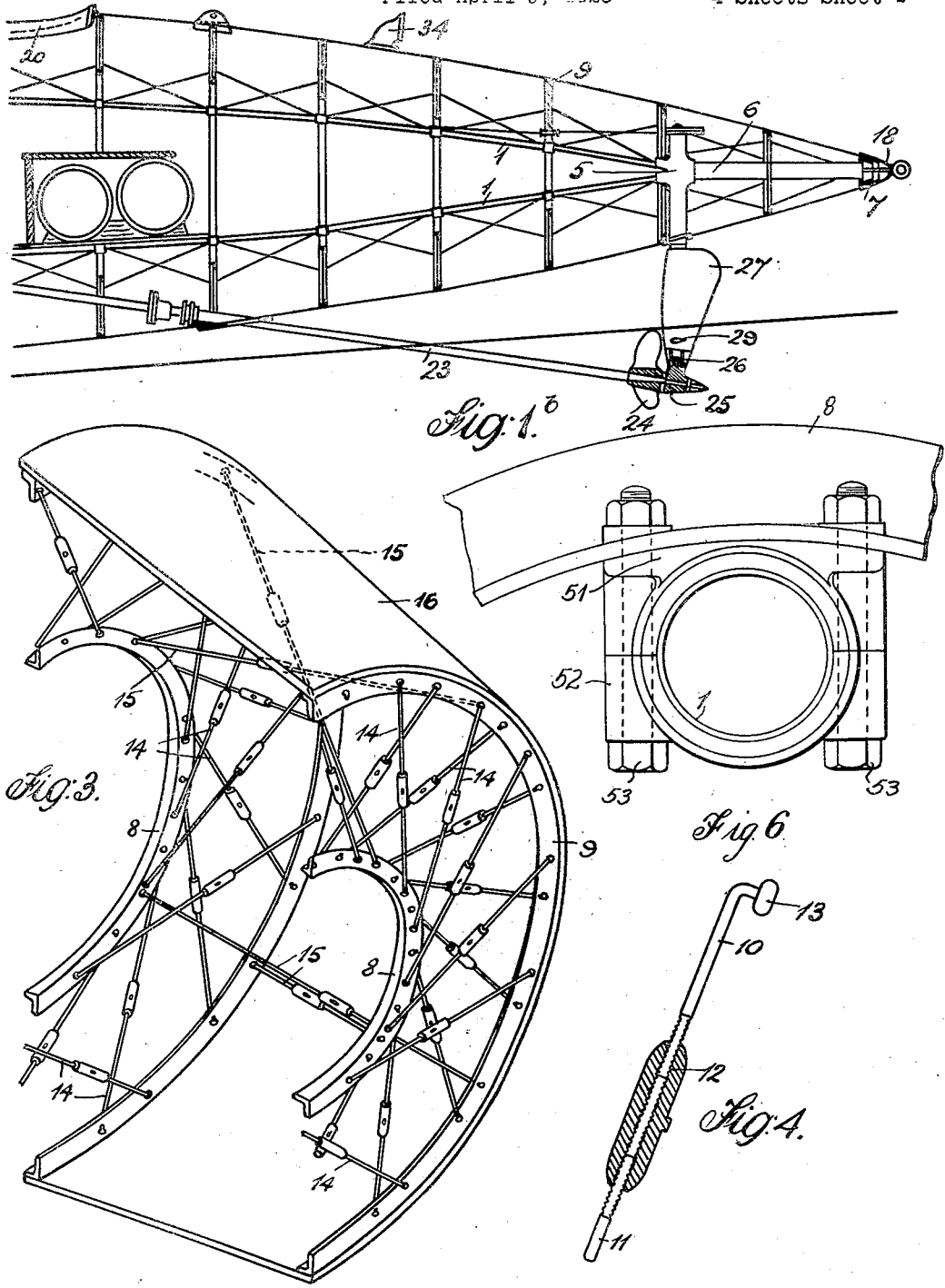
INVENTOR.
Gustavus Green.
by A. E. O'Neill
Attorney.

Jan. 22, 1924.  
G. GREEN  
1,481,707
HULL OR BODY CONSTRUCTION OF SHIPS, AIRCRAFT, AND MOTOR ROAD VEHICLES
Filed April 9, 1923    4 Sheets-Sheet 3
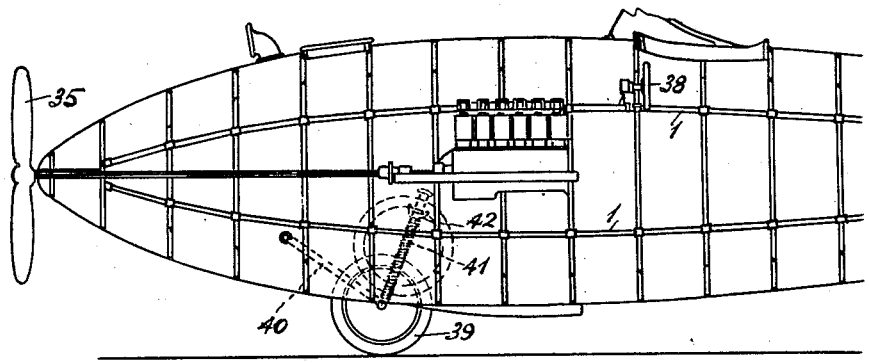
Fig. 9.ª
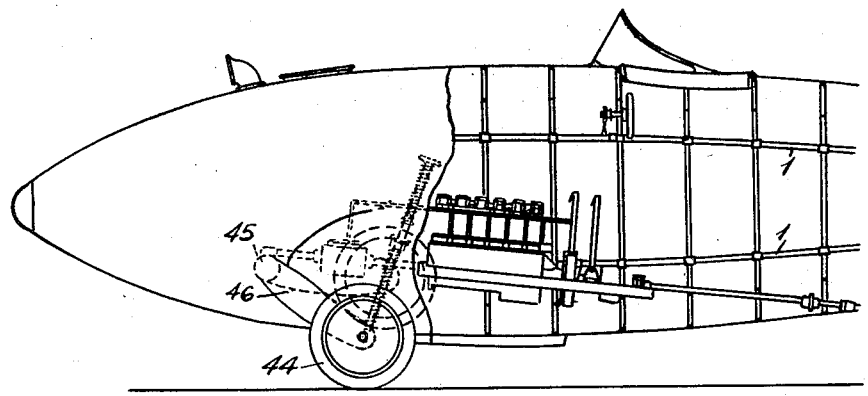
Fig. 11.ª
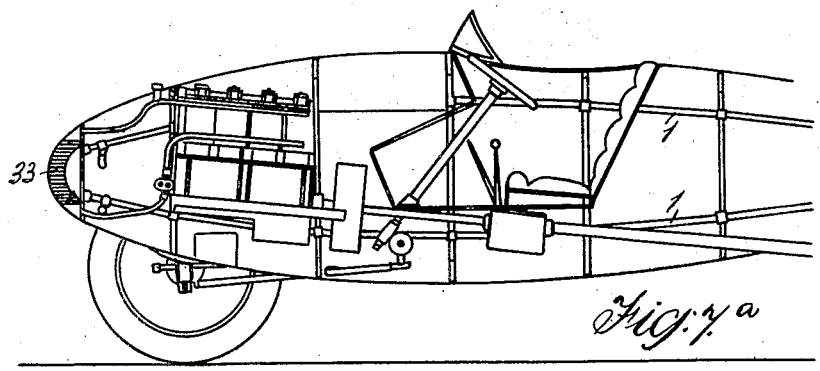
Fig. 7.ª
INVENTOR  
Gustavus Green.  
by G. F. Odell  
Attorney.

Jan. 22, 1924. 1,481,707
G. GREEN
HULL OR BODY CONSTRUCTION OF SHIPS, AIRCRAFT, AND MOTOR ROAD VEHICLES
Filed April 9, 1923 4 Sheets-Sheet 4
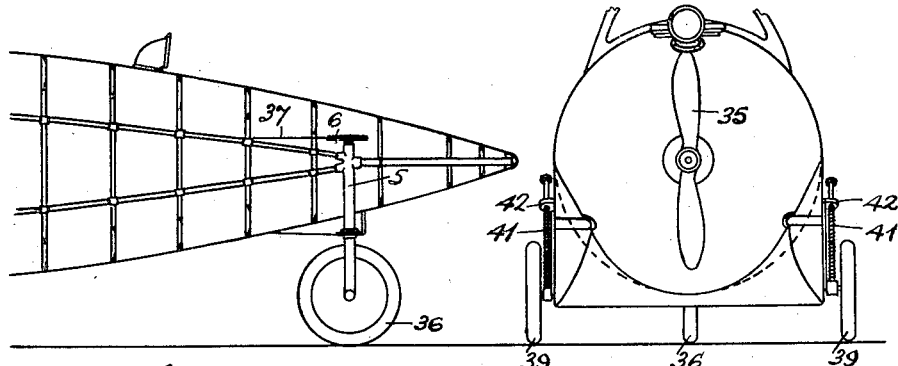
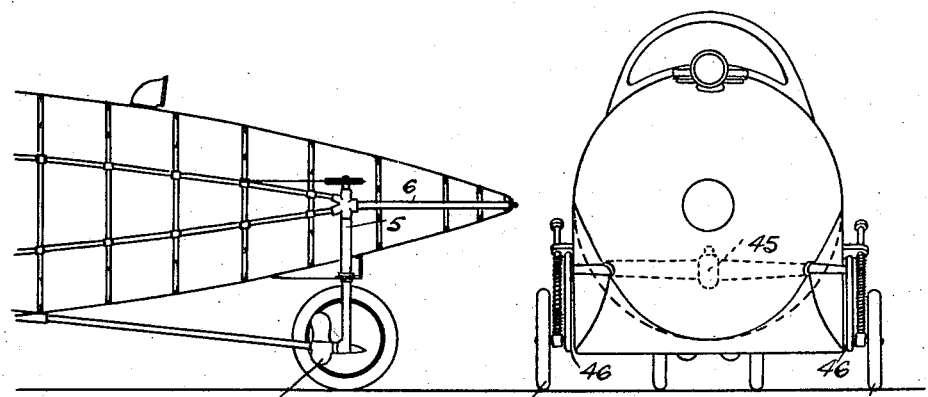
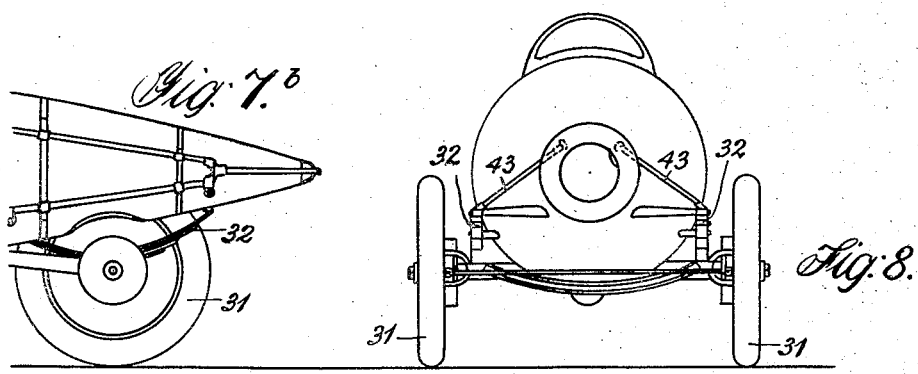
INVENTOR
Gustavus Green.
by A. L. O'dell
Attorney.

Patented Jan. 22, 1924.

1,481,707

UNITED STATES PATENT OFFICE.

GUSTAVUS GREEN, OF TWICKENHAM GREEN, ENGLAND.

HULL OR BODY CONSTRUCTION OF SHIPS, AIRCRAFT, AND MOTOR ROAD VEHICLES.

Application filed April 9, 1923. Serial No. 630,911.

*To all whom it may concern:*

Be it known that I, GUSTAVUS GREEN, a subject of the King of Great Britain and Ireland, residing at Edwin Road, Twickenham Green, in the county of Middlesex, England, have invented new and useful Improvements in and Relating to the Hull or Body Construction of Ships, Aircraft, and Motor Road Vehicles, for which I have filed applications in England on the 24th December, 1921, No. 34722/1921, and Cognate application No. 28838/1922, filed 23d October, 1922, of which the following is a specification.

This invention relates to improvements in hull construction, more especially applicable to the building of the high speed water craft known as skimming boats, but capable of use also in other kinds of ships, in the hulls of aeroplanes and air ships, and in the bodies of motor road vehicles, as well as in vessels intended for two or more of these purposes.

The framing which forms the characteristic feature of the invention is built upon longitudinal frame members, preferably tubes, extending substantially the whole length of the vessel, converging together and substantially meeting at their ends and bowed apart in their middle portion to a distance which is a substantial fraction of the width of the hull. A series of hoop frames is secured at intervals along these members, and a second series of hoop frames concentric with the first is carried from them by pivotally connected tension members in the nature of spokes like those of a cycle wheel. These outer hoops may vary in size to give the skin of the vessel which is secured upon them any desired contour, usually a stream-line form, the size of the inner hoops and curvature of the longitudinal frame members also conforming generally to this contour.

By bowing the longitudinal frame members widely apart I make the space between them available for engines, or as a gangway and so forth according to the size and purpose of the vessel. Further by arranging the spokes tangentially as described below the hull is better enabled to resist twisting stresses, since any stress tending to rotate the skin relatively to the longitudinal frame members is resisted by the tension of the spokes.

Other features of the invention and the modifications by which it is adapted for use in vessels or vehicles of different kinds are explained hereinafter with reference to the accompanying drawings, in which—

Figures 1ª and 1ᵇ together show longitudinal section and

Figure 2 a part cross section, part end elevation of a skimming boat.

Figure 3 is an enlarged half section of the hull in isometric projection to show the disposition of the tension members.

Figures 4 and 5 are details of the tension members and their fastening.

Figure 6 is a detail of the fastening of the inner hoops to the longitudinal tubes.

Figures 7ª and 7ᵇ together show a longitudinal section of a motor road vehicle and Figure 8 is an end view of the same.

Figures 9ª and 9ᵇ together show a longitudinal section of a vessel adapted for use on land and water and Figure 10 shows an end elevation of the same.

Figures 11ª and 11ᵇ together show a longitudinal section of a modified construction of vessel for use on land and water and Figure 12 is an end elevation of the same.

In Figures 1–6 the framing of the vessel is based upon a skeleton frame of longitudinal tubes or other members 1, four in number in the example shown; these extend substantially the whole length of the boat. They are united at the bow end by a spider 2 integral with or secured upon a tube 3 which carries at its other end a plate 4 with a conical flange. At the stern end the members 1 are similarly united by being lodged in sockets in a stern post tube 5, which, like the bow spider, has projecting from it a tube 6 carrying at its end a plate 7 with a conical flange. Both at the bow and the stern the sockets for the reception of the longitudinal tubes 1 may be split and fitted with threaded lugs by which they may be tightened upon the tubes; and a similar means of fastening may be employed for the attachment of the tubes 3 and 6.

At intervals along the members 1 there are secured hoop frames 8 consisting of complete rings of angle iron, channel iron or the like. The method of fastening is shown in Fig. 6; the base 51 of a plummer block is curved to fit the hoop and with the cap 52 fits the longitudinal tube, bolts 53 securing the halves of the plummer block together and to the hoop. Concentric with these inner hoops is another series of hoops 9 of larger diameter. These hoops are bent in a tire bending machine, and the angle of the flange (in the case of angle iron) is varied from hoop to hoop so that the cylindrical or conical part of the flange will lie flush with plating resting upon the succession of hoops. These outer hoops 9 are secured to the hoops 8 by tension members in the nature of spokes like those of a cycle wheel. The construction and arrangement of these tension members appears more clearly in Figures 3 to 5. Each spoke consists of two parts 10, 11, screwing into a sleeve 12 having right and left-hand threads respectively in its ends, so that by its rotation by the aid of a knurled rib in the centre the composite spoke may be tensioned or slackened. At their ends the spokes are turned at right angles and provided with an enlarged head 13. Openings of key-hole shape 54 are formed in the flat surface of angle iron hoops, the larger portion of the opening permitting passage of the head 13 and the smaller fitting the neck of the spoke. This arrangement gives a ready means of replacing any tension member that may be fractured or damaged. Moreover it makes the connection of the tension members pivotal, so that there are no joints to be stressed in shear, but all stresses are resisted by the tensile strength of the spokes.

In Figure 3 there are two sets of these spokes 14 extending from each inner to each outer hoop approximately tangentially to the inner hoop; and in addition there may be spokes 15 uniting each inner hoop to the outer hoops on each side of it. Not all of these spokes are shown in Figure 1. It is not essential that this precise disposition of spokes should be adopted.

Upon the outer hoops is laid the plating 16 which constitutes the skin of the ship; this terminates at the bow end upon the coned flange of plate 4 and at the stern end upon the coned flange of plate 7, and it is completed at each end by a dished steel plate 17, 18 respectively, held in place by a bolt passing through the tubes 3 and 6 respectively. Suitable hatchways as 19 may be provided, as also a cock pit 20, and to enable these to be of larger size some of the hoops 8 and 9 may if desired be made incomplete. It is convenient in such cases to bend the ends of the inner hoop into a vertical position and to join them to the ends of the incomplete outer hoop.

For small or moderate sizes of boat, for example for ships' life-boats, small high speed motor boats, and so forth, the skin may be moulded in two parts only, constituting half shells which preferably join along a horizontal line at midheight of the vessel. A convenient construction is to form the two half shells with outwardly turned flanges and to fit between these flanges a wooden rib of, for instance, silver spruce, which will form a rubbing strake around the vessel. The half shells are bolted together through this rib, and any minor adjustments necessary to make the half shells fit exactly may be effected by slight planing of the rib where required. The lower half shell may be pressed with a hollow rib projecting downward along its midline and this may subsequently be filled with lead to form a keel or otherwise fitted with a keel if such is required.

The engine 21 is carried upon transverse tubes 22 secured to the longitudinal frame members 1, and is preferably set in an inclined position as shown so that it may be in alignment with the propeller shaft 23, which carries a screw propeller 24 at a suitable distance beneath the stern of the boat. The propeller shaft is supported at its outer end in a bearing 25 carried upon a rod 26 passing through the stern post tube 5. About this same rod there rotates a rudder 27 diminishing in width towards its lower end, so that the effective area of the rudder is reduced as the boat rises upon its speed increasing. If intended for use as a skimming boat the vessel is fitted with hydroplanes 28 which may advantageously be carried on each side of it upon frames attached to the tubes 22 which support the engine or to other tubes of similar form; these tubes may be arranged to draw out laterally through the skin of the ship for the purpose of lifting out the engine when required. A smaller hydro-plane 29 may be provided on each side of the rudder 27.

Chines or bilge keels of any usual form may be built out from the circular frame of the vessel to prevent undue rolling; and for instance a stepped bottom may be built on to the ship in well known fashion. In Figure 2 there are shown chines 30 with approximately vertical and horizontal surfaces extending respectively from the mid horizontal and mid vertical line of the hull cross section. If these in themselves do not afford sufficient strength the under part of the hull, which must chiefly withstand the shocks of water resistance, may be further strengthened by tubular bracing extending diagonally between the longitudinal tubes 1 and the outer hoops 9 or from the inner hoops 8 to the skin of the hull. The hull may also be further strengthened by tapes of steel, such as are used in aeroplane construction, running from end to end of the vessel and having their ends secured under the caps 17 and 18 respectively. There may for instance be three such tapes on the under side of the hull and two above.

Such a boat as is shown in Figures 1 and 2 may be built on a larger scale still for use as a skimming boat and in a wide range of sizes for use as an ordinary boat. Vessels large enough to accommodate a crew wholly within the boat may also serve for submarine purposes, the cock pit being of course closed and suitable provision made by way of periscopes or the like for observation.

Ships' life-boats may also be built with means for closing the hatch completely so that the boat may be launched without much regard to the position in which it is lowered upon the water. A hull such as has been described is readily fitted with seats on each side between the hoops. For instance canvas seats may be hung over a bar joining two outer hoops at about the height of the mid line of the vessel and over the adjacent lower longitudinal tube. If the two ends of the canvas are joined by springs an elastic seat is afforded, the movements of which are sufficiently damped by the friction of the canvas upon the tubes and rods.

For vessels of war a gun may readily be mounted at the bow and arranged to shoot through the end rings, the nose cap being correspondingly modified. Or a torpedo tube may be located in the stern, the stern being truncated as compared with the construction illustrated so that the end ring is of sufficient diameter for the accommodation of the torpedo tube.

Figues 7 and 8 show how a motor road vehicle may be built on the same lines as the boat of Figures 1 and 2. The hull and frame described form both the body and chassis of the car, so saving weight. The chassis is fitted with four road wheels of which the two rear wheels 31 are driven from the shaft of the engine in the usual manner. The springs 32 which carry these wheels are shackled to the main longitudinal tubes 1, and a similar construction may be employed at the front. The radiator 33 replaces the ventilator shown at 34 in Figure 1. If the body is specially narrow there may be additional struts as indicated at 43 connecting the ends of the springs to the upper main tubes 1. it will be apparent that, by enlarging the diameter of the body, space may be found for the driver and passengers wholly within the body, so making an all-weather car.

The vessel of Figures 9 and 10 is adapted for use upon either land or water. It is driven by a tractor screw 35. Its rear wheels 36 are discs (shod with the usual pneumatic tires) which can be rotated about the axis of the stern post tube 5 by means of flexible connections 37 extending to the steering wheel 38. Alternatively the car may be built as a tri-car with a single rear wheel which similarly may serve as the rudder. The front wheels 39 are carried upon a rocking arm 40 which is kept in the lower of the two positions indicated by means of spiral springs 41 engaged between the wheel axle and a collar 42 in a swivelling block secured to the body of the car. When the vehicle enters the water the two front wheels may be drawn up by operating bayonet joints on the abutment collars 42 and allowing the springs 41 to pass up through the swivelling blocks, so that the wheels take the upper position shown in dotted lines in Figure 9.

This construction may also be adopted for use as an aeroplane or as the car of an airship. An aeroplane constructed with such a body may be adapted in case of need to alight upon the water and convert itself into a sea-worthy boat. For this purpose the aeroplane is preferably built as a monoplane and its wings are folded close beside the hull so that the craft may be adapted to withstand a heavy sea, or the wings could be entirely discarded if necessary.

Alternatively in a car of this construction the rear wheels 36 may be mounted separately in forks, the upper ends of which are carried in swivelling bearings which may be rotated from within by means of worm or other gearing. By this means the back wheels also may be swung clear of the water when the vessel is used as a boat. In this case a rudder would be provided as in Figure 1, both it and the rear wheels being coupled with the steering wheel.

The construction shown in Figures 11 and 12 is also adapted for use on both land and water. But in this case, when in use as a car, the front wheels 44 are driven through a lay axle 45 of the nature of the usual car rear axle, and through chains enclosed in cases 46. When in the water the boat is driven by a screw propeller 47 the shaft of which may be declutched from the engine when the car is on land. As in the construction of Figure 9, the front wheels 44 may be lifted when the vessel enters the water, the gear casings 46 then serving as radius rods. The end of the propeller shaft is supported in a bearing hung from the rear axle or direct from the stern post, and the rear wheels may be used for steering purposes in water as on land, or a rudder may be provided in addition as mentioned with reference to Figure 9.

What I claim is:

1. A framing for hulls of vessels and bodies of vehicles and aircraft comprising longitudinal frame members conformed to the shape of the hull, hoops encircling said members at intervals, plummer blocks secured on said hoops and each surrounding a longitudinal member, a second series of hoops surrounding the first, and tension members joining inner and outer hoops.

2. A construction of hull for vessels comprising longitudinal frame members converging at their ends, spiders one at each end of the framing receiving the ends of said longitudinal members, stems integral with said spiders, hoops surrounding said longitudinal members, plating upon said hoops, and dished plates secured on said stems completing said plating.

3. A motor boat comprising longitudinal frame members converging at their ends and bowed apart in the middle, a stern post having sockets to receive the ends of said members, inner hoops uniting said members at intervals, outer hoops, spokes supporting said outer hoops from said inner hoops, transverse frame members carried from said longitudinal members, an engine supported on said transverse members with its shaft inclined, a propeller upon a prolongation of said shaft, and a bearing for said shaft carried by said stern post.

4. A motor boat comprising longitudinal frame members converging at their ends and bowed apart in the middle, inner hoops uniting said members at intervals, outer hoops, spokes supporting said outer hoops from said inner hoops, transverse frame members carried from said longitudinal members, an engine supported on said transverse members, and hydroplanes carried by said transverse members.

5. A double purpose vessel comprising longitudinal frame members, inner and outer hoops surrounding said frame members at intervals, the inner hoops joined to them, spokes joining the inner and outer hoops, plating covering said outer hoops, an engine carried on said frame members, a screw propeller driven by said engine, road wheels supporting said frame members, the rear wheels being solid discs, and steering means for turning said wheels.

6. A double purpose vessel comprising longitudinal frame members, inner and outer hoops surrounding said frame members at intervals, the inner hoops joined to them, spokes joining the inner and outer hoops, plating covering said outer hoops, an engine carried on said frame members, a screw propeller driven by said engine, road wheels supporting said frame members and driven by said engine, and means for disconnecting the screw propeller from the engine while the road wheels are driven, and for disconnecting the road wheels from the engine while the screw propeller is driven.

In testimony whereof I have signed my name to this specification.

GUSTAVUS GREEN.